United States Patent
Sunaga

(10) Patent No.: US 11,165,932 B2
(45) Date of Patent: Nov. 2, 2021

(54) IMAGING APPARATUS, IMAGING SYSTEM, VEHICLE AND FOREIGN MATTER DETERMINATION METHOD

(71) Applicant: KYOCERA Corporation, Kyoto (JP)

(72) Inventor: Toshihiro Sunaga, Machida (JP)

(73) Assignee: KYOCERA Corporation, Kyoto (JP)

( * ) Notice: Subject to any disclaimer, the term of this patent is extended or adjusted under 35 U.S.C. 154(b) by 721 days.

(21) Appl. No.: 16/063,786

(22) PCT Filed: Dec. 14, 2016

(86) PCT No.: PCT/JP2016/087268
§ 371 (c)(1),
(2) Date: Jun. 19, 2018

(87) PCT Pub. No.: WO2017/110628
PCT Pub. Date: Jun. 29, 2017

(65) Prior Publication Data
US 2020/0274994 A1    Aug. 27, 2020

(30) Foreign Application Priority Data
Dec. 22, 2015   (JP) .............................. JP2015-250520

(51) Int. Cl.
*H04N 5/217*    (2011.01)
*H04N 5/232*    (2006.01)
(Continued)

(52) U.S. Cl.
CPC ............ *H04N 5/2171* (2013.01); *B60S 1/485* (2013.01); *G03B 17/18* (2013.01); *H04N 5/232123* (2018.08)

(58) Field of Classification Search
CPC .... H04N 5/2171; H04N 5/23212; B60S 1/485
(Continued)

(56) References Cited

U.S. PATENT DOCUMENTS 5,920,382 A  *  7/1999  Shimizu .................. G08G 1/166
                                                         356/3.14
7,310,190 B2 *  12/2007  Fox ......................... G01N 21/15
                                                         359/618
(Continued)

FOREIGN PATENT DOCUMENTS

EP          2571247 A1      3/2013
JP       2005-225250 A      8/2005
(Continued)

*Primary Examiner* — Ricky D Shafer
(74) *Attorney, Agent, or Firm* — Procopio Cory Hargreaves and Savitch LLP

(57) ABSTRACT

The imaging apparatus 10 includes the lens 11, the image sensor 12 and the controller 14. A light receiving surface of the image sensor 12 is disposed on a focused position of an object by the lens 11, the object being located at a specific object distance. The controller 14 generates one or more second images from a first image obtained from the image sensor 12, the focus position of the second images being changed to an object distance different from a specific object distance, and determines the presence of foreign matters adhered to the surface on the object side of the lens, on the basis of the focused state of the second image.

10 Claims, 12 Drawing Sheets

(51) Int. Cl.
*B60S 1/48* (2006.01)
*G03B 17/18* (2021.01)

(58) Field of Classification Search
USPC .......................................................... 359/507
See application file for complete search history.

(56) References Cited

U.S. PATENT DOCUMENTS

| | | | | |
|---|---|---|---|---|
| 8,063,759 | B2* | 11/2011 | Bos | B60R 1/00 |
| | | | | 340/461 |
| 8,937,680 | B2 | 1/2015 | Higashitsutsumi | |
| 9,813,593 | B2 | 11/2017 | Akiyama et al. | |
| 10,893,214 | B2* | 1/2021 | Sunaga | B60R 11/02 |
| 2008/0174678 | A1* | 7/2008 | Solomon | G06T 7/194 |
| | | | | 348/231.99 |
| 2013/0050543 | A1 | 2/2013 | Higashitsutsumi | |
| 2016/0165101 | A1 | 6/2016 | Akiyama et al. | |
| 2020/0195837 | A1* | 6/2020 | Miu | G02B 27/0075 |

FOREIGN PATENT DOCUMENTS

| | | |
|---|---|---|
| JP | 2005-286404 A | 10/2005 |
| JP | 2010-081273 A | 4/2010 |
| JP | 2011-239292 A | 11/2011 |
| WO | 2015/011998 A1 | 1/2015 |

* cited by examiner

IMAGING APPARATUS, IMAGING SYSTEM, VEHICLE AND FOREIGN MATTER DETERMINATION METHOD

CROSS-REFERENCE TO RELATED APPLICATION

This application claims priority from and the benefit of Japanese Patent Application No. 2015-250520 filed on Dec. 22, 2015, the entire contents of which are incorporated herein by reference.

TECHNICAL FIELD

This disclosure relates to an imaging apparatus, an imaging system, a vehicle and a foreign matter determination method.

BACKGROUND

In recent years, a lot of imaging apparatuses are mounted on a vehicle and are used to detect obstacles ahead of the vehicle and road environment while the vehicle is traveling or to assist the driver in parking and the like. The image information detected by the imaging apparatus is displayed on a monitor in front of the driver's seat and is used to assist the driver with a view. Alternatively, the image information is transmitted to a controller of the vehicle after the image processing and is used for automatic control of the vehicle and for warning notice to the driver when a danger occurs. Further, a lot of surveillance cameras are installed on streets, parking, roadsides and the like.

In some cases, when foreign matters such as water drops adhere to a lens or a cover glass on the object side of the lens due to bad weather, a blurred image or lack of a part of an image occurs, and thus a clear image may not be obtained. Further, when an imaging apparatus is disposed inside the vehicle to monitor outside the vehicle through a wind shield, it is difficult to obtain a clear image if foreign matters adhere to the wind shield in front of the imaging apparatus. Thus, various technologies to automatically detect foreign matters adhered to a lens of an imaging apparatus, a cover glass or a wind shield have been proposed.

For example, a technology of determining the presence of foreign matters has been disclosed. By the technology, when foreign matters such as water drops adhere to a lens of an imaging apparatus having an autofocus function, the presence of foreign matters is determined by putting focus on the foreign matters by using the autofocus function (see, for example, JP2010-081273A (PTL 1)).

CITATION LIST

Patent Literature

PTL 1: JP2010-081273A

SUMMARY

The imaging apparatus according to this disclosure includes an imaging optical system, an image sensor and a processor. The imaging optical system forms an image of an object. The image sensor obtains an image of an object formed by the imaging optical system. A light receiving surface of the image sensor is disposed on a focused position of the imaging optical system when an object is located at a specific object distance. The processor generates one or more second images from a first image obtained by the image sensor, a focus position of the second images being changed to an object distance that is different from the specific object distance. On the basis of the focused state of the second image, the processor determines the presence of foreign matters adhered to a surface on the side closest to the object of the imaging optical system or to a surface of a light transmissive member located closer to the object than the imaging optical system.

Further, the imaging system according to this disclosure includes an imaging apparatus and a foreign matter removing apparatus. The imaging apparatus includes an optical system, an image sensor and a processor. The imaging optical system forms an image of an object. The image sensor obtains an image of an object formed by the imaging optical system. A light receiving surface of the image sensor is disposed on a focused position by the imaging optical system when the object is located at a specific object distance. The processor generates one or more second images from a first image obtained by the image sensor, a focus position of the second images being changed to an object distance that is different from the specific object distance. On the basis of the focused state of the second image, the processor determines the presence of foreign matters adhered to a surface on the side closest to the object of the imaging optical system or to a surface of a light transmissive member located closer to the object than the imaging optical system. When the processor determines that foreign matters adhere to the surface of the optical device or of the light transmissive member, the foreign matter removing apparatus performs foreign matter removing operation.

Further, a vehicle according to this disclosure includes an imaging apparatus. The imaging apparatus includes an imaging optical system, an image sensor and a processor. The imaging optical system forms an image of an object. The image sensor obtains an image of an object formed by the imaging optical system. A light receiving surface of the image sensor is disposed on a focused position of the imaging optical system when the object is located at a specific object distance. The processor generates one or more second images from a first image obtained by the image sensor, a focus position of the second images being changed to an object distance that is different from the specific object distance. On the basis of the focused state of the second image, the processor determines the presence of foreign matters adhered to a surface on the side closest to the object of the imaging optical system or to a surface of a light transmissive member located closer to the object than the imaging optical system.

Further, a foreign matter determination method according to this disclosure includes a step of obtaining an image of an object by an image sensor whose light receiving surface is disposed at a focused position of the object at a specific distance of the imaging optical system. The foreign matter determination method includes a step of generating one or more second images from a first image, a focus position of the second images being changed to an object distance that is different from the specific object distance. In the foreign matter determination method, on the basis of the focused state of the second image, the presence of foreign matters adhered to a surface on the side closest to the object of an imaging optical system or to a surface of a light transmissive member located closer to the object than the imaging optical system is determined.

DETAILED DESCRIPTION

In the imaging apparatus used in the environment accompanied by vibrations such as a camera for a vehicle, a mechanism having a drive part such as autofocus is prone to break down by vibration. Thus, fixed-focus cameras without a focusing mechanism are often used. When adding an autofocus function to a vehicle-mounted imaging apparatus, an increase in cost and an increased risk for malfunction are concerns. Further, fixed-focus cameras are often used also for general security cameras.

The imaging apparatus according to this disclosure can detect the presence of foreign matters adhered to a surface of an optical system of an imaging optical system or to a surface of a light transmissive member located closer to an object than the imaging optical system with a simple configuration.

Embodiments of this disclosure will be described with reference to drawings. It is to be noted that drawings used for the description below are schematic drawings and are not necessarily to scale.

Embodiment 1

First, fundamental principles of foreign matter detection method of an imaging system according to Embodiment 1, which is one of embodiments of this disclosure, are described below with reference to FIGS. 1 to 3.

Figure 1:
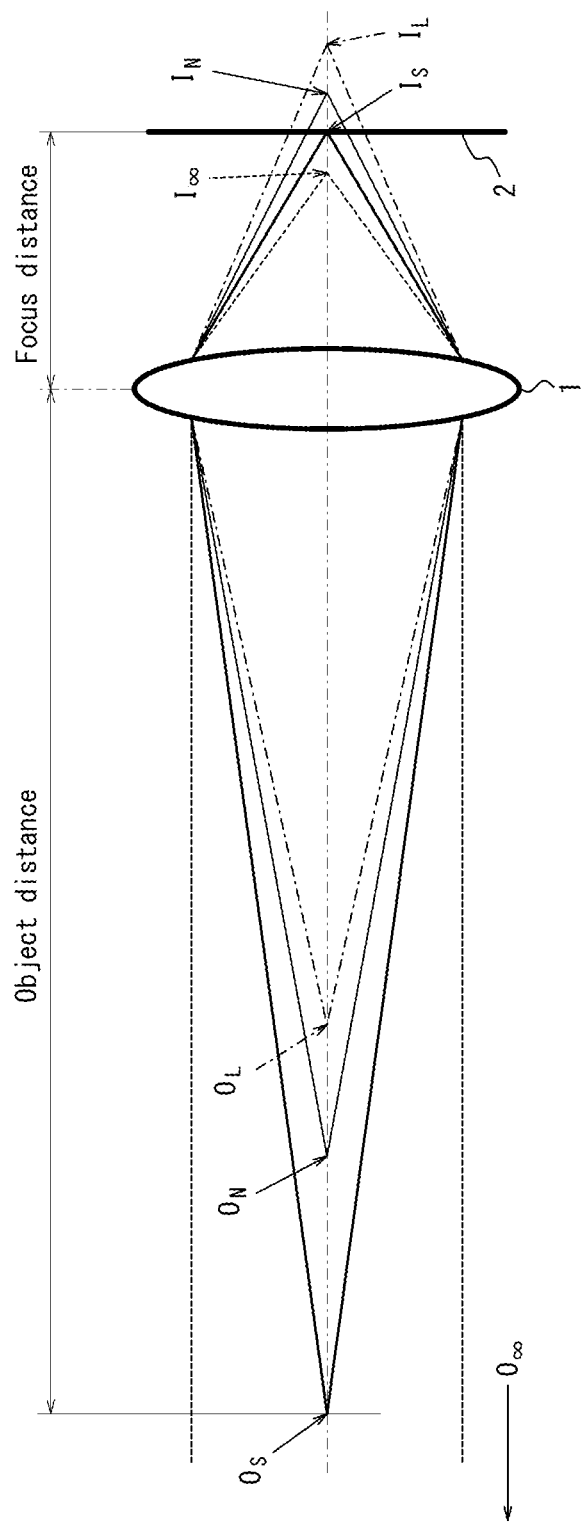
FIG. 1 is a diagram illustrating a relationship between an object position and an image forming position of an optical system of a lens.

FIG. 1 illustrates an optical system for a vehicle mounted imaging apparatus including a lens 1 and a light receiving surface 2 of an image sensor 12. The light receiving surface 2 of the image sensor 12 is disposed at an image forming position where the object image Is of the object Os located at a preset object distance (a specific object distance) is focused as indicated by a bold solid line. The image forming position where the object image is focused is referred to as a focused position. Therefore, an image captured by the imaging apparatus is in a focused state in a range of depth of field around the specific object distance. The specific object distance is set differently depending on the application of the imaging apparatus. When the imaging apparatus is used to monitor ahead of a vehicle, a relatively long distance is set to monitor far distance.

Further, in FIG. 1, the broken line indicates the light from the object $O_\infty$ located at an infinite object distance. Further, the thin solid line indicates the light from the object $O_N$, which is an object to be captured, located at a position closest to the imaging apparatus. Further, the dashed-dotted line indicates the light from the object $O_L$ such as foreign matters which adhere to a surface on the object side of the lens 1 or to a surface of a light transmissive member such as a wind shield located closer to the object than the lens 1. A member through at least a part of which the visible light can transmit, such as a glass, is referred to as a light transmissive member. The light rays from objects $O_\infty$, $O_N$ and $O_L$ are focused on the positions of object images $I_\infty$, $I_N$ and $I_L$, respectively. These object images have blur on the light receiving surface 2 of the image sensor 12 disposed at a position of the object image $I_S$.

Next, a foreign matter detection method of the imaging system according to this embodiment is described with reference to FIG. 2.

Figure 2:
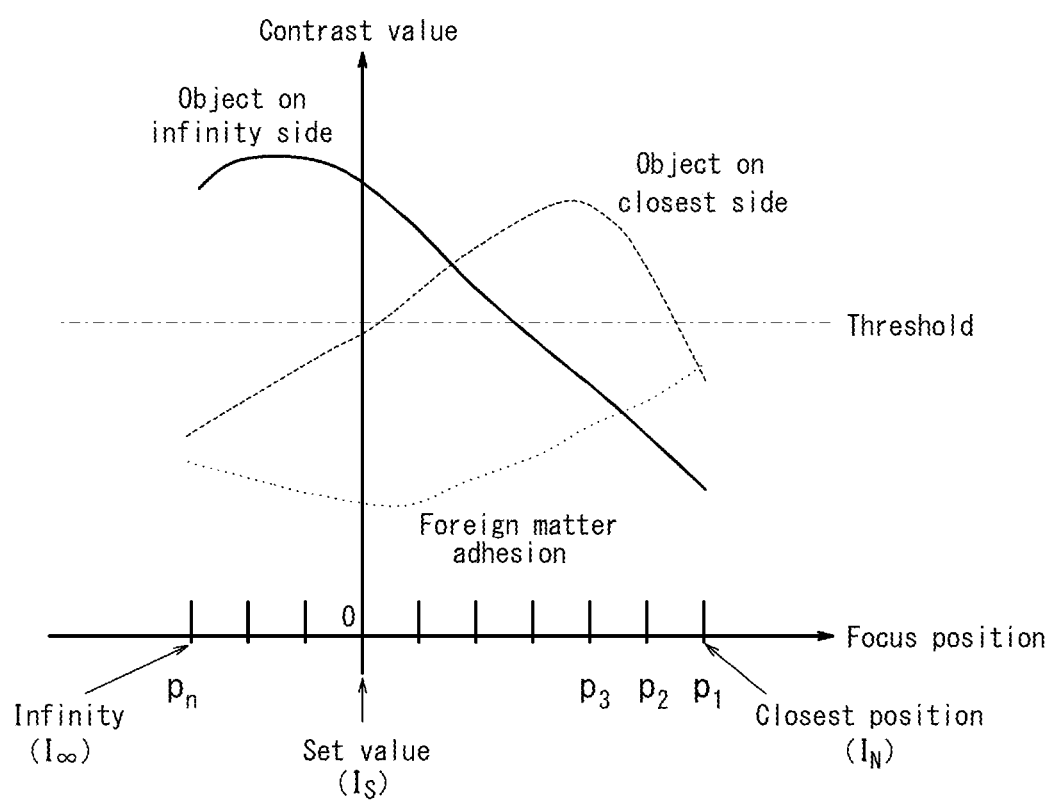
FIG. 2 is a diagram illustrating a focused state determination method.

FIG. 2 illustrates a change in the contrast value in the optical system of the imaging apparatus in FIG. 1 in the case where the image forming position at which the light receiving surface 2 of the image sensor 12 is disposed can be displaced with respect to the lens 1 and the position is displaced. In FIG. 2, an image forming position is put on the horizontal axis and a contrast value of an image obtained by the image sensor 12 is put on the vertical axis. On the horizontal axis, the position of the object image $I_S$ where the light receiving surface 2 of the image sensor 12 is set is defined as 0. The image forming positions from $p_1$ to $p_n$ correspond to the object positions, respectively. $P_1$ on the horizontal line corresponds to the focused position of the object image ($I_N$) of the object ($O_N$) located at the closest position. Here, the closest position is a position closest to the object to be captured on the object side of the lens 1. For example, in the imaging apparatus that monitors ahead of the vehicle, the position ahead of the lens 1 by 2 to 3 m can be set as the closest position. Further, $p_n$ corresponds to the focused position of the object image ($I_\infty$) of the object ($O_\infty$) located at infinity. Further, the contrast value is a value represented by (Lmax−Lmin)/(Lmax+Lmin), where Lmax is the maximum luminance and Lmin is the minimum luminance of the entire image in one frame.

When an object image is focused on the light receiving surface 2 of the image sensor 12, an image obtained by the image sensor 12 is the clearest and the contrast value is high. Further, the contrast value decreases as the light receiving surface 2 is displaced away from the focused position. In FIG. 2, the solid line is a graph illustrating the contrast value with respect to the image forming position when an object is located on infinity side, and in the graph, the contrast value is low near the image forming position ($p_1$) corresponding to the closest side and there is a peak of the contrast value near the image forming position ($p_n$) corresponding to the infinity side. Further, the broken line in this figure is a graph illustrating the contrast value with respect to the image forming position when an object is located on the closest side, and in the graph, there is a peak of the contrast value near the image forming position ($p_1$) corresponding to the closest side, and the contrast value is low near the image forming position ($p_n$) corresponding to the infinity side. Thus, the contrast value of an image differs depending on the object distance and the image forming position of an image.

Further, the dotted line in FIG. 2 is a curve illustrating the contrast value when foreign matters adhere to the surface on the object side of the lens 1. The object is not focused on any of image forming positions due to foreign matters, and thus the contrast value is low at all image forming positions corresponding to any of the positions from the closest to infinity.

The threshold indicated by the dashed-dotted line in FIG. 2 is defined in advance as follows on the basis of actual measurement. First, the distance to the object is set in a range from the closest position to infinity with the surface of the lens 1 adhered with no foreign matter, and each peak contrast value when the image sensor 12 is disposed at the image forming positions from $p_1$ to $p_n$ is measured. Such actual measurement is performed with respect to each object disposed at a plurality of object distances different from each other. Next, the light receiving surface 2 of the image sensor 12 is disposed at the image forming positions from $p_1$ to $p_n$ with the surface of the lens 1 adhered with foreign matters such as water drops to measure the contrast value. Then, thresholds are set to the value lower than the peak contrast value measured with no foreign matter adhered and to the value higher than the contrast value measured with foreign matter adhered. In this manner, when the threshold of the contrast value is set in advance, adhesion of foreign matters to the surface of the lens 1 can be determined to some degree through confirmation of the contrast value of the image obtained by disposing the light receiving surface 2 at each of image forming positions from $p_1$ to $p_n$.

As aforementioned, when the distance between the lens 1 and the light receiving surface 2 can be changed, the presence of foreign matters on the surface of the lens 1 can be detected by shifting the light receiving surface 2 to the optical axis direction of the lens 1 to detect the contrast value. In other words, when the contrast value higher than the threshold is detected at any one of the image forming positions from $p_1$ to $p_n$, the object image is focused on the light receiving surface 2 of the image sensor 12, and thus it is determined that no foreign matter is adhered to the lens 1.

However, when the relationship between the lens 1 and the light receiving surface 2 of the image sensor 12 is fixed to the set value of 0, only the contrast value at the image forming position of set value can be obtained from a captured image itself. In this case, when looking at the contrast value when the set value of the image forming position is 0 in FIG. 2, it exceeds the threshold on the basis of the graph of solid line indicating that the object is located on infinity side, and thus it is determined as a focused state. On the other hand, the dotted line graph indicating adhesion of foreign matters does not exceed the threshold, and thus it is not determined as a focused state. However, the contrast value does not exceed the threshold also with respect to the broken line graph indicating the case where the object is located on the closest side, and thus it is not determined as a focused state. In other words, detection error may occur when the contrast value of the image captured at the set value of 0 is only used.

Thus, in the imaging apparatus according to this disclosure, a deconvolusion technique is used to generate an image whose focus position is different (i.e. an image forming position is different) from an image captured at an image forming position at the set value. The image captured at an image forming position at the set value is a first image. The image at a different focus position generated by using the deconvolution technique is a second image. An image at different focus position generated by using the deconvolution technique is also referred to as a focus position change image. The imaging apparatus determines a focused state on the basis of the contrast value by using the focus position change image, and thus the presence of foreign matters adhered to the surface of the lens 1 is detected.

The deconvolution technique is a technique to restore a blurred image by convolving an inverse filter of the optical characteristics H (x, y) of blur obtained from Point Spread Function (PSF) into an input image. In this embodiment, the data of inverse filter of the optical characteristics H (x, y) when displaced from the focus position at the set value is stored in advance, and on the basis of the data, a focus position change image whose focus position is displaced from the focus position at the set value to the closest side and to infinity side is generated. The presence of foreign matters adhered to the surface of the lens 1 can be determined with accuracy by computing the contrast value of an image at each of image forming positions of $p_1, p_2, p_3, \ldots, p_n$ through operation. The image generation method using the deconvolution technique on the basis of Point Spread Function is a known art, and thus the explanation thereof is omitted.

Figure 3:
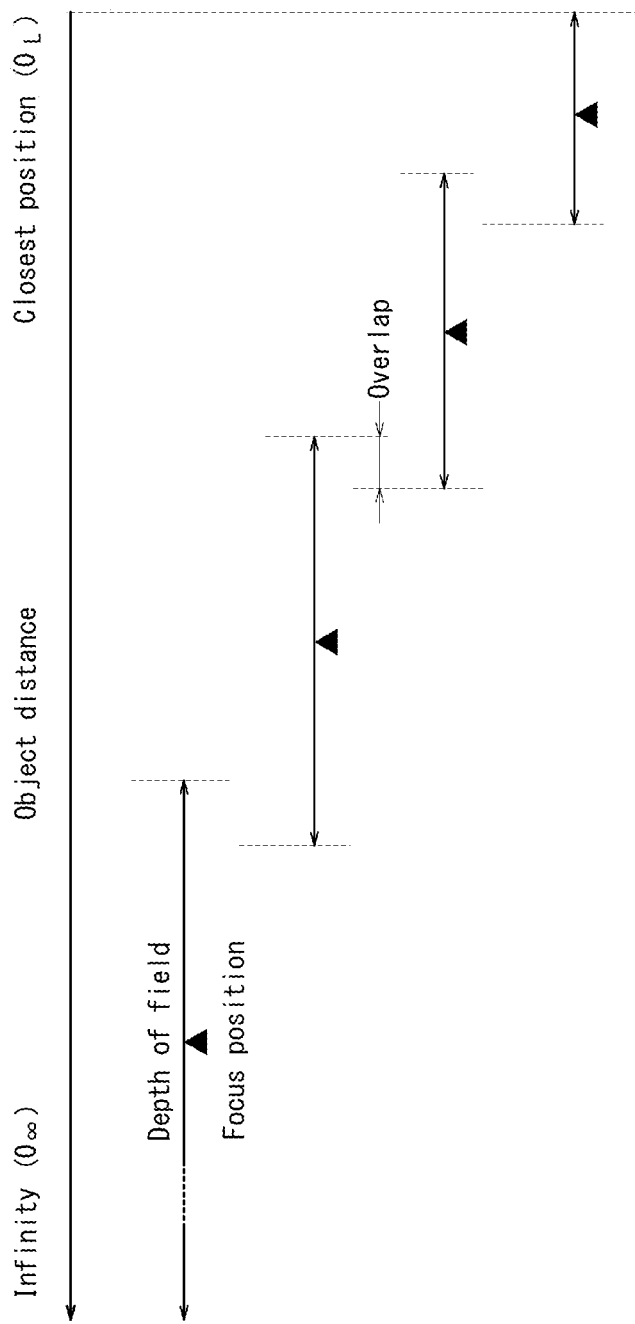
FIG. 3 is a diagram illustrating focus positions disposed from the closest position to infinity.

Further, as illustrated in FIG. 3, in this embodiment, the image forming positions from $p_1$ to $p_n$ are set so that the object distance from infinity to the closest position is included in a range of the depth of field of any of focus position change images to generate a focus position change image. In particular, the number of operations can be reduced by setting each focus position so that the depth of field ranges of focus position change images are in contact or slightly overlapped with each other.

Figure 4:
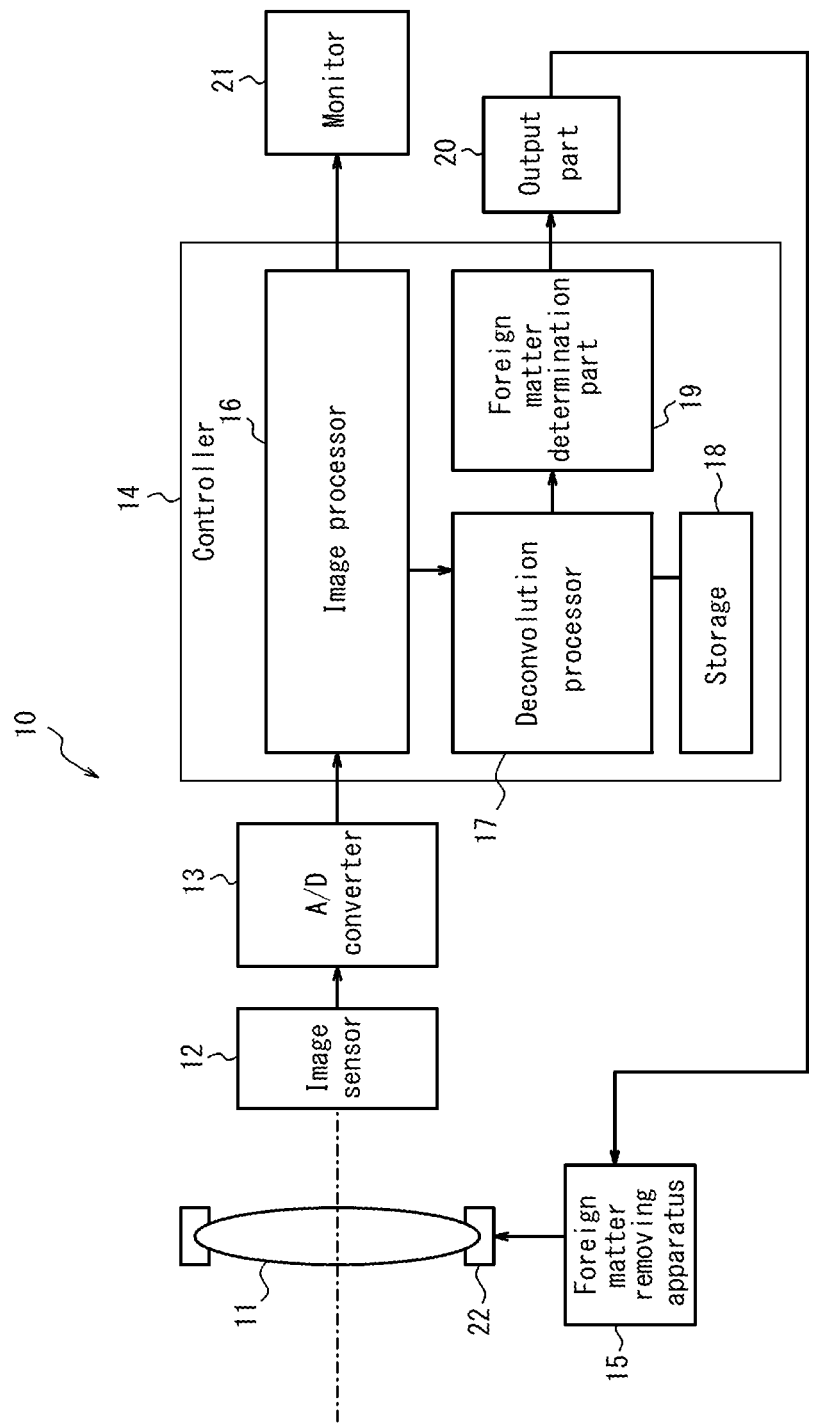
FIG. 4 is a block diagram illustrating a configuration of an imaging system according to Embodiment 1.

Next, the configuration of the imaging system according to Embodiment 1 is described. FIG. 4 is a block diagram illustrating a configuration of the imaging system according to Embodiment 1. The imaging system according to this embodiment is mounted on a vehicle. Here, the "vehicle" according to this disclosure may include automobiles, rail vehicles, industrial vehicles and living vehicles, but not limited thereto. Automobiles may include, for example, passenger cars, trucks, buses, two-wheel vehicles, trolleybuses and the like, but not limited thereto, and may include other vehicles that travel on a road. Rail vehicles may include locomotives, cars, passenger coaches, street cars, guide-rail system railroads, ropeways, cable cars, linear motor cars and monorails, but not limited thereto, and may include other vehicles that travel along railways. Industrial vehicles may include, for example, agricultural and construction industrial vehicles and the like. Industrial vehicles may include, for example, forklifts, golf carts, and the like, but not limited thereto. Agricultural industrial vehicles may include, for example, tractors, tillers, transplanters, binders, combines, lawn mowers and the like, but not limited thereto. Construction industrial vehicles may include, for example, bulldozers, scrapers, loading shovels, crane vehicles, dump trucks, road rollers and the like, but not limited thereto. It is to be noted that vehicle classification is not limited to the aforementioned examples. For example, automobiles may include industrial vehicles that can travel on the road. Same vehicle may be included in some categories.

The imaging system has an imaging apparatus 10 configured by including a lens 11, an image sensor 12, an A/D converter 13 and a controller 14 and a foreign matter removing apparatus 15. The imaging optical system includes the lens 11.

The lens 11 has a positive refractive power that forms an image of an object on the light receiving surface 2 of the image sensor 12. In FIG. 4, although the lens 11 is illustrated as a single lens, it may be composed by combining a plurality of lenses. Further, the optical system of the imaging apparatus 10 may be composed of a plurality of optical devices including the lens 11. In that case, the lens 11 illustrated in figure is an optical device located on the side closest to the object of the optical system.

The image sensor 12 includes an image sensor. The image sensors include solid image sensors such as Charge Coupled Device (CCD), Complementary Metal Oxide Semiconductor (CMOS) and the like. The image sensor 12 converts an object image passing through the lens 11 and formed on the light receiving surface 2 into electrical signals and outputs the signals to the A/D converter 13. The lens 11 and the image sensor 12 are disposed fixedly with each other. Therefore the distance between the lens 11 and the image sensor 12 is fixed. The position of the lens 11 relative to the image sensor 12 is defined so that the light receiving surface 2 of the image sensor 12 is located at the position of the object focused by the lens 11, the object being located at a predefined specific object distance.

The A/D converter 13 converts analog image signals output from the image sensor 12 into digital image signals, and outputs the digital image signals to the controller 14. The controller 14 includes one or more processors. The controller 14 or the processor may include one or more memories to store program for various processings and the information during operation. Memory includes volatile memories and non-volatile memories. Memory includes a memory independent from a processor and a memory embedded in a processor. Processor includes a general purpose processor that reads specific program and performs a specific function and a special processor dedicated to a specific processing. The dedicated processor includes Application Specific Integrated Circuit (ASIC). The processor includes Programmable Logic Device (PLD). PLD includes Field-Programmable Gate Array (FPGA). The controller 14 may be either System-on-a-Chip (SoC) in which one or more processors corporate with each other or System In a Package (SiP). The processing performed by the controller 14 can also be described as that performed by the processor.

The controller 14 includes each function block of an image processor 16, a deconvolution processor 17, a storage 18 and a foreign matter determination part 19, and applies various processings to the image signals output from the A/D converter 13. Each function block may be a hardware module or a software module. The controller 14 can perform operation performed by each function block. The controller 14 is not limited to those including the image processor 16, the deconvolution processor 17, the storage 18 and the foreign matter determination part 19, and one or more of these function blocks may be omitted. The controller 14 may perform all operations performed by each function block. The operation performed by each function block may be restated as that performed by the controller 14. The processing performed by the controller 14 through any one of the function blocks may be performed by the controller 14 itself. Further, the imaging apparatus 10 further includes an output part 20. The output part 20 is an output interface that outputs signals to the foreign matter removing apparatus 15. The output part 20 can adopt physical connectors and wireless communication devices. The controller 14 can transmit control signals to the foreign matter removing apparatus 15 through the output part 20 of the imaging apparatus 10.

The image processor 16 applies a specific image processing such as a noise removal, a color interpolation, a luminance correction, a color correction, a gamma correction, a white balance and the like to the image signals output from the A/D converter 13 and outputs the signals to a monitor 21 disposed on the dashboard of the vehicle. Further, the image processor 16 recognizes an object such as a pedestrian, an obstacle, a white line on a road and the like, and displays such image on the monitor 21 by processing or emphasizing a part thereof. Thus the image processor 16 calls a driver's attention to a pedestrian, an obstacle and the like. Alternatively, the image processor 16 may transmit the detected object's information to the control device of the vehicle over the in-vehicle network such as CAN. In this manner, the vehicle can give an alarm or provide drive assist such as an automatic brake to the driver.

Further, the image processor 16 calculates the contrast value of the image signals continuously output from the A/D converter 13. When the contrast value decreases over time or decreases below the predefined value, the image processor 16 activates foreign matter detection processing by the deconvolution processor 17 and the foreign matter determination part 19. The presence of foreign matters such as raindrops on the surface on the object side of the lens 11 can be detected by this processing.

The deconvolution processor 17 performs a deconvolution processing to an image obtained from the image sensor 12, which is a first image, by using the data stored in the storage 18. Thus, the deconvolution processor 17 generates an image (a focus position change image) whose focus position is changed to one or more object distances different from the aforementioned specific object distance from infinity to the closest position. In other words, the deconvolution processor 17 generates one or more second images. The storage 18 is a non-volatile memory, and stores an inverse filter of the optical characteristics H (x, y) of blur on the basis of Point Spread Function determined by the configuration of the imaging optical system. With respect to a captured image, the deconvolution processor 17 generates a focus position change image through convolution operation of the inverse filter.

The foreign matter determination part 19 calculates the contrast value with respect to respective focus position change images, having focus positions different from each other, generated by the deconvolution processor 17. The foreign matter determination part 19 compares the contrast value of each focus position change image whose focus position is changed to different object distances from infinity to the closest position with the predefined threshold (specific threshold). When the contrast value exceeds this threshold, the foreign matter determination part 19 determines that the focus position change image is focused at the focus position.

Here, as aforementioned, the predefined threshold is determined from the actual measurement value of the contrast value with respect to the case where foreign matters adhered to the surface of the lens 11 and the case where foreign matters not adhered thereto. The contrast value is measured with respect to a lot of images captured under various environments by disposing an object at different distances from infinity to the closest position. When the contrast value is larger than the threshold, a predefined threshold is set to a value that allows for discrimination of an image captured with no foreign matter adhesion from an image captured with foreign matter adhesion. Further, various kinds of thresholds may be provided depending on the environments such as those during travel on the highway or on the city streets or on the luminance, and on the basis of the obtained image, the controller 14 may determine the environment or luminance around the vehicle and switch to any of the contrast values.

When determining that any of the focus position change images is focused, the foreign matter determination part 19 determines that no foreign matter adheres. Further, when determining that no focus position change image is focused, the foreign matter determination part 19 determines that foreign matters adhere to the surface on the object side of the lens 11. When determining that foreign matter adheres, a signal indicating an abnormality is output from the output part 20 to the foreign matter removing apparatus 15.

The foreign matter removing apparatus 15 is configured by including a piezoelectric element, for example, and removes foreign matters adhered to the surface of the lens 11 by coming in contact with a lens holding part 22 that holds the lens 11 and applying vibration to the surface of the lens 11. Further, in FIG. 4, although the foreign matter removing apparatus 15 is disposed outside the imaging apparatus 10, it may be integrated in the imaging apparatus 10.

Further, the foreign matter removing apparatus 15 is not limited to those vibrating the lens 11, and may be provided as various forms such as those spraying gas to the lens 11 or those operating a wiper provided on the lens 11 to remove foreign matters.

Figure 5:
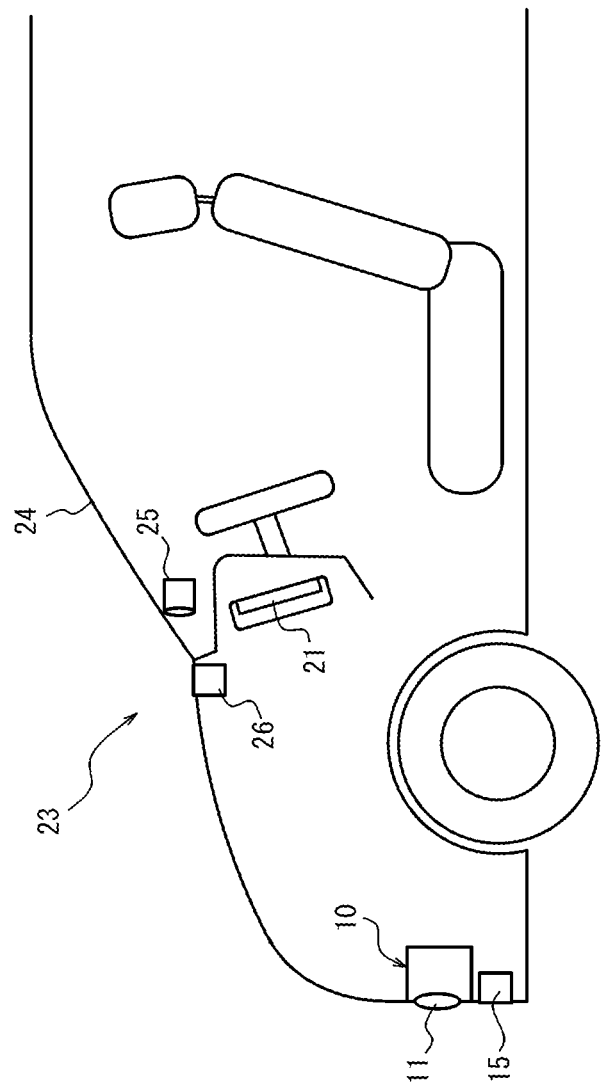
FIG. 5 is a diagram illustrating an example of mounting the imaging system of FIG. 4 on a vehicle.

Next, FIG. 5 is a diagram illustrating an example of the imaging system in FIG. 4 mounted on a vehicle.

In the vehicle 23, an imaging system including the imaging apparatus 10 and the foreign matter removing apparatus 15 is mounted on the front bumper of the vehicle 23, for example, and displays an obtained image on the monitor 21. The lens 11 of the imaging apparatus 10 is exposed forward from the vehicle. Thus foreign matters such as raindrops and dust easily adhere to the front surface (object side) of the lens 11. When foreign matters adhere to the lens 11, the contrast value detected by the image processor 16 decreases, and thus foreign matter detection is performed by the deconvolution processor 17 and the foreign matter determination part 19. When the foreign matter determination part 19 determines that there are foreign matters, vibration is applied to the surface of the lens 11 by the foreign matter removing apparatus 15 and foreign matters are removed.

Further, as another aspect of the imaging system, FIG. 5 illustrates an imaging apparatus 25 disposed on the dashboard inside the wind shield 24 and a foreign matter removing apparatus 26 disposed outside the wind shield 24. The wind shield 24 is a light transmissive member. The imaging apparatus 25 captures a view outside the vehicle through the wind shield 24. Further, the foreign matter removing apparatus 26 has a gas spray mechanism. When the imaging apparatus 25 detects that foreign matters adhere to the wind shield 24 in front thereof, the foreign matter removing apparatus 26 sprays gas such as air to the region of the wind shield 24 through which the view light entering the imaging apparatus 25 transmits in accordance with an instruction from the controller 14. In the case of such a configuration, the closest position is located on the side closer to the object than the wind shield 24, which is outside the vehicle.

Further, the foreign matter removing apparatus can also act as a wiper of the wind shield 24 in the vehicle 23. In other words, when detecting foreign matters, the imaging apparatus 10 may be configured to transmit signals to activate the wiper to the control device of the vehicle 23.

In addition to the aforementioned positions, the imaging system can be mounted on various positions such as inside, outside, lateral part and rear part of the vehicle 23.

Figure 6:
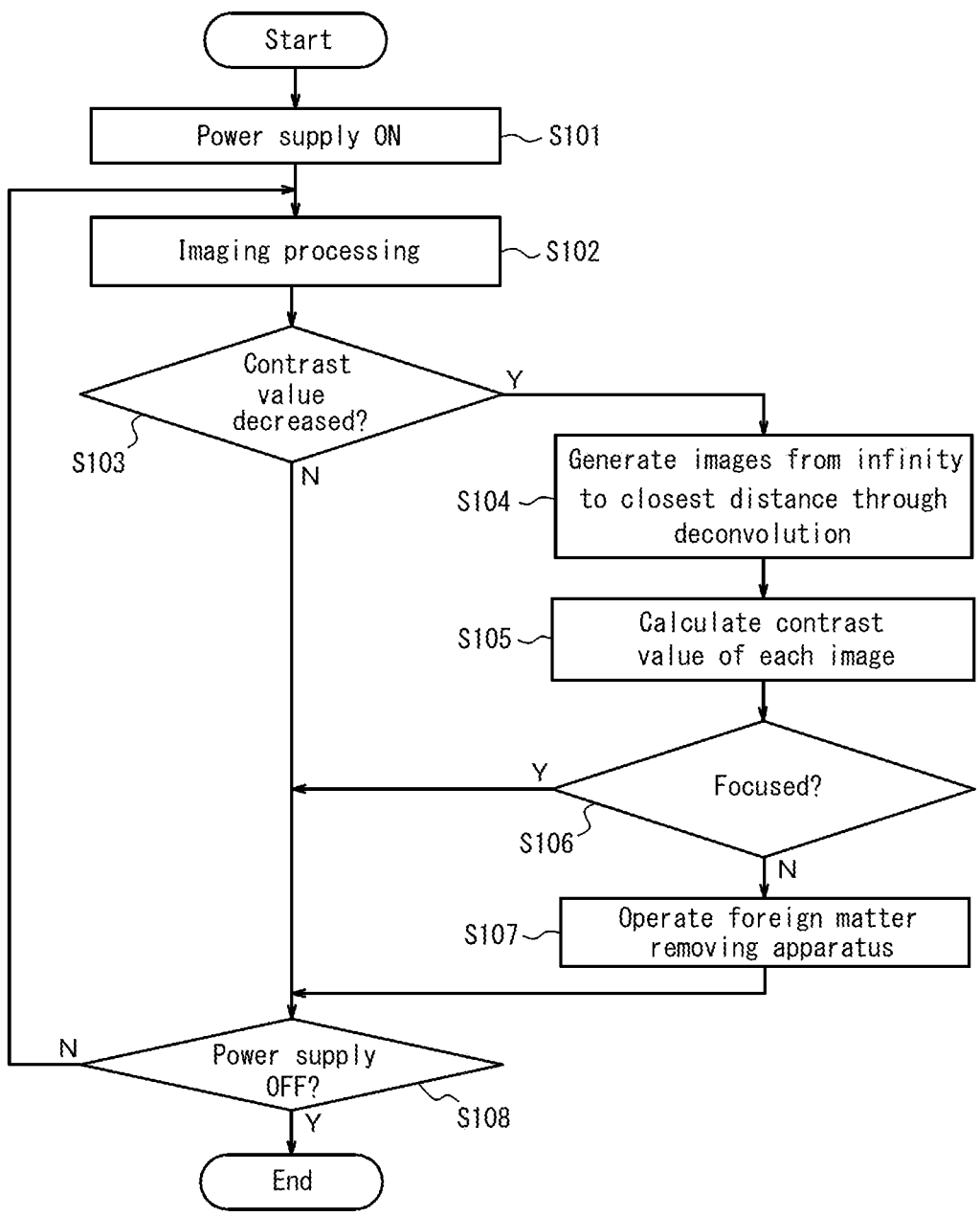
FIG. 6 is a flowchart illustrating a process by a controller according to Embodiment 1.

Next, the processing of the controller 14 according to Embodiment 1 is described with reference to the flowchart in FIG. 6.

First, the power supply of the imaging apparatus 10 is turned on through drive of the engine of the vehicle 23 or through operation by the driver (step S101). Thus a capturing processing is started (step S102).

In the capturing processing, an image outside the vehicle formed by the lens 11 is captured by the image sensor 12, converted by the A/D converter 13 and delivered to the controller 14. In the controller 14, required image processing is applied to the image by the image processor 16 and after that, processing for displaying the image on the monitor 21 is continuously performed. During the capturing processing, the image processor 16 calculates the contrast value of the image signal output from the A/D converter 13 and monitors a decrease in the contrast value (step S103). When detecting a decrease in the contrast value, the image processor 16 activates the processing through the deconvolution processor 17 (step S104). When detecting no decrease in the contrast value, process proceeds to step S108.

In step S104, the deconvolution processor 17 performs convolution operation to the image (first image) output from the A/D converter 13 by using the inverse filter of optical characteristics of blur stored in the storage 18. The deconvolution processor 17 generates a plurality of focus position change images (second images) whose focus positions are adjusted to object distances from infinity to the closest position, respectively. As aforementioned, the object distance may be set so that a distance from infinity to the closest position is included in the range of the depth of field of any of the focus position change images. The focus position change image corresponds to an image obtained by shifting the light receiving surface 2 of the image sensor 12 to each of image forming positions of $p_1, p_2, p_3, \ldots p_n$ in FIG. 2.

Next, the foreign matter determination part 19 calculates the contrast value with respect to each focus position change image generated by the deconvolution processor 17 (step S105). Further, the foreign matter determination part 19 compares the contrast value of each focus position change image with the predefined threshold (specific threshold) (step S106). When the contrast value exceeds the threshold, the foreign matter determination part 19 determines that the focus position change image is focused at the focus position.

When determining that any of the focus position change images is focused, the foreign matter determination part 19 determines that no foreign matter adheres and ends the foreign matter detection processing, and the process proceeds to step S108. On the other hand, when determining that all of the focus position change images are not focused, the foreign matter determination part 19 determines that foreign matters adhere. When determining that foreign matters adhere, the foreign matter determination part 19 outputs signals indicating an abnormality to the foreign matter removing apparatus 15 through the output part 20 to operate the foreign matter removing apparatus 15 (step S107). Thus the foreign matter removing apparatus 15 vibrates the lens 11 to remove foreign matters such as waterdrops adhered to the surface of the object side of the lens 11.

After the foreign matter removing apparatus 15 is operated, the process of the controller 14 proceeds to step S108. In order to confirm the results of foreign matter removal by the foreign matter removing apparatus 15, steps S104 to S106 may be performed again after a certain time period from step S107.

In step S108, the controller 14 returns to step S102 again unless the power supply is turned off and appropriately repeats the process from step S102 to step S107.

As aforementioned, the imaging system according to this embodiment generates a focus position change image and determines the focused state on the basis of the contrast value of the focus position change image. Therefore, adhesion of foreign matter to the surface on the object side of the lens 11 can be detected even if the imaging apparatus 10 having no autofocus function but having fixed-focus function by which the positional relationship between the lens 11 and the image sensor 12 is fixed is used. Thus foreign matters can be removed by the foreign matter removing apparatus 15.

This imaging system detects foreign matters from a captured image only through the operation processing by the controller 14 without requiring any mechanism for operating the lens 11 or the image sensor 12 to detect foreign matters. Thus the system can be configured to be durable, less likely to be failed, compact and low cost.

Further, the threshold is provided on the basis of the results of actual measurement made in advance with respect to the contrast value of the focus position change image so that the focused state can be determined by a simple criterion of whether the threshold is exceeded or not. Thus the foreign matter determination part 19 can make a determination at high speed.

Further, in this imaging system, a plurality of focus positions are set so that positions from infinity to the closest position are included in a range of depth of field of any of focus position change images. Thus, with this imaging system, detection is possible whatever object distance the image is focused at, and the detection accuracy increases.

Further, the imaging system according to this embodiment can be also applied to the imaging system that includes the imaging apparatus 25 disposed in the vehicle as illustrated in FIG. 5. In that case, the presence of foreign matters adhered to the surface of glass (light transmissive member) such as the wind shield 24, for example, through which a light path of the light captured by the imaging apparatus 25 transmits is a subject to be detected. When the foreign matter determination part 19 determines that foreign matters adhere to the wind shield 24, the foreign matter removing apparatus 26 removes the foreign matters adhered to the wind shield 24.

Embodiment 2

Figure 7:
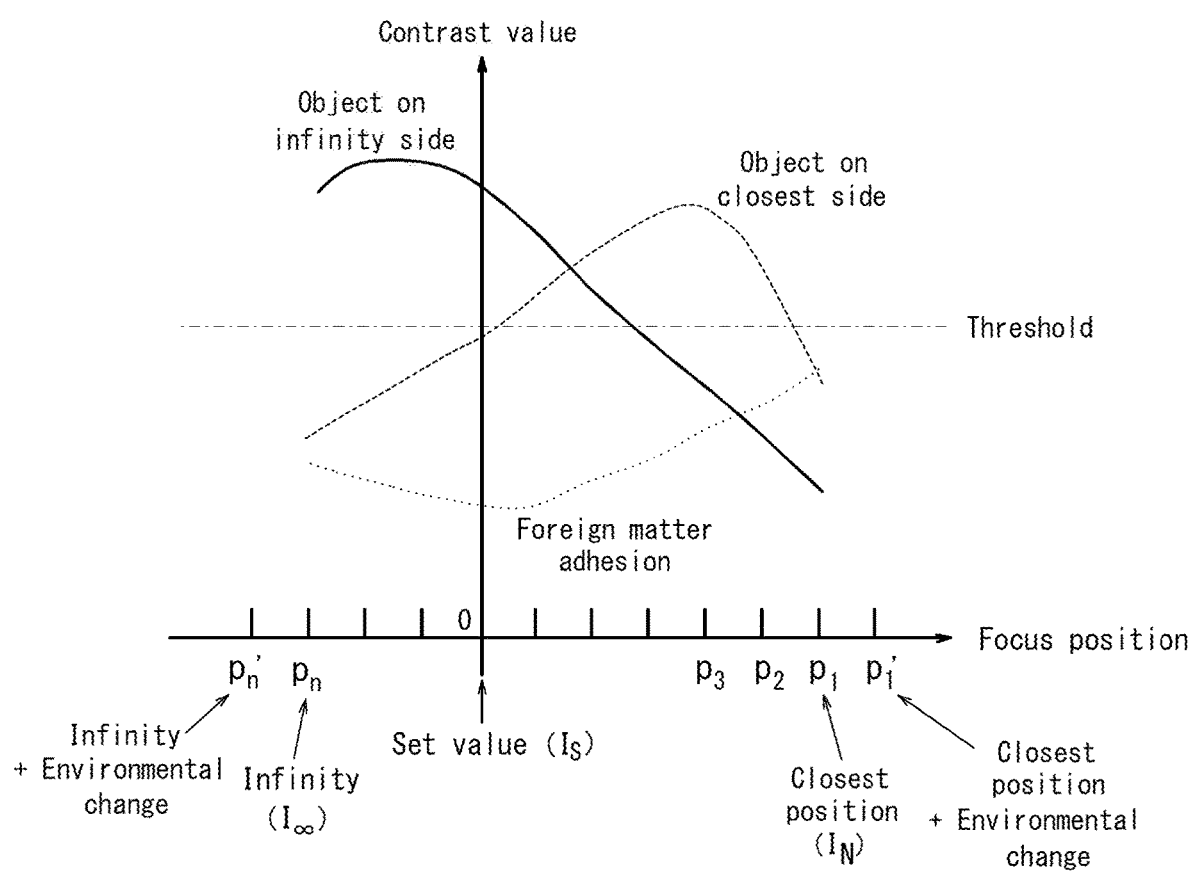
FIG. 7 is a diagram illustrating a focused state determination method according to Embodiment 2.

In an imaging optical system such as the lens 11, the characteristic such as focal length is changed by the environmental change such as temperature change and the like. Thus, in the imaging system according to Embodiment 2, image forming positions at which a focus position change image is generated are set in advance in consideration of focus position variation due to a temperature change, on the basis of the imaging system according to Embodiment 1. In FIG. 7, in addition to the image forming positions from $p_1$ to $p_n$ as illustrated in FIG. 2, $p_n'$ and $p_1'$ are defined as the image forming positions at which a focus position change image is generated. $P_n'$ is a focused position when the focus position of the object $O_\infty$ at infinity is displaced to the object side due to environmental change. $P_1'$ is a focused position when the focus position of the object $O_N$ at the closest position is displaced to the direction opposite to the object direction due to environmental change. Here, $p_n'$ and $p_1'$ can be set in advance on the basis of the shift amount and/or shift direction determined on the basis of the specification range of the operation temperature environment of the imaging optical system. Specifically, they can be determined by means of simulation and/or actual measurement. Foreign matter detection processing, that is, image generation by the deconvolution processor 17 and determination of a focused state by the foreign matter determination part 19 are performed also with respect to the image formed on these image forming positions of $p_n'$ and $P_1'$. When the image is focused on at least one of the image forming positions of $p_n'$ and $p_1'$, it is determined that no foreign matter adhered. In this manner, more accurate foreign matter detection without relying on the environmental change is possible.

Embodiment 3

Figure 8:
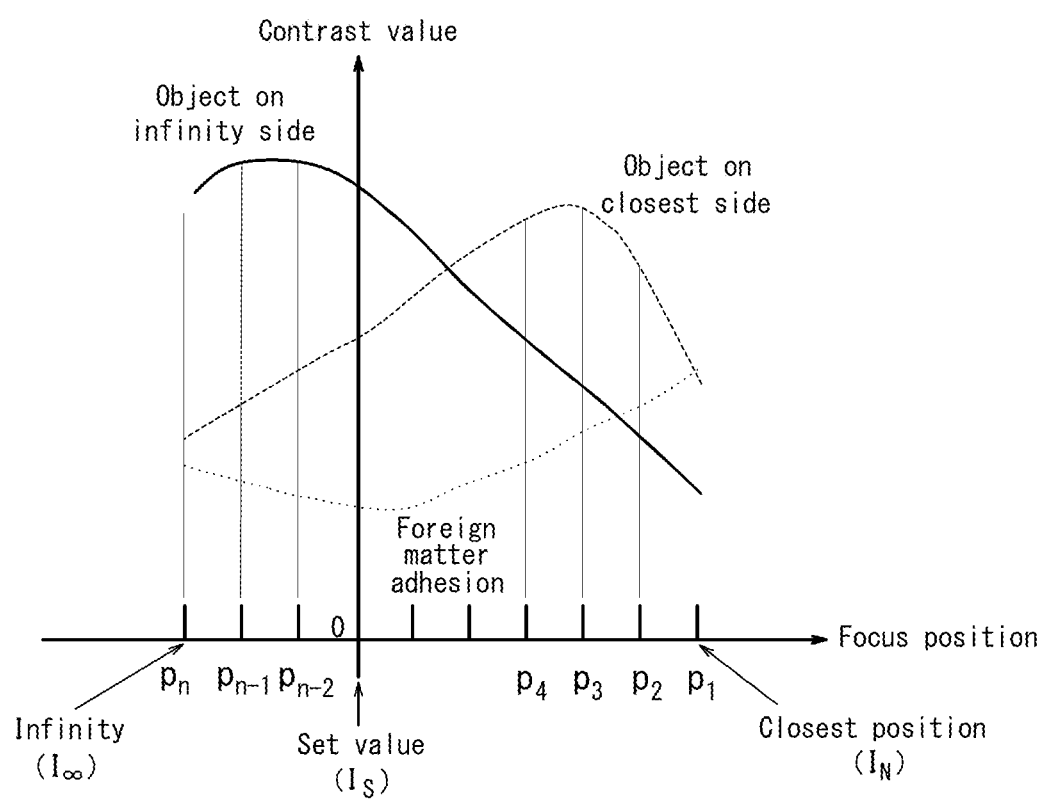
FIG. 8 is a diagram illustrating a focused state determination method according to Embodiment 3.

The imaging system according to Embodiment 3 is different from that according to Embodiment 1 in the foreign matter presence determination method. FIG. 8 is a diagram illustrating a focused state determination method of the foreign matter determination part 19 in the imaging system according to Embodiment 3. In this determination method, the deconvolution processor 17 generates a focus position change image at the image forming position corresponding to three or more object distances in the range from infinity to the closest position by using the deconvolution technique.

Next, the foreign matter determination part 19 calculates the contrast value of each focus position change image, and after that, estimates the presence of a peak value in the graph indicating the change of the contrast value with respect to the image forming position. For example, when there is an object on the side of infinity, assuming that the graph of contrast value indicated by the solid line is obtained, it is estimated that there is a peak value between the image forming positions, $p_{n-1}$ and $p_{n-2}$. Further, when there is an object on the closest side, assuming that a graph of contrast value indicated by the broken line is obtained, it is estimated that there is a peak near the image forming position of $p_3$. Further, even if an image of a plurality of objects at different object distances is included in an actual image, it is highly possible that a peak value of the contrast value appears at a specific image forming position corresponding to the object distance of an object that occupies a large portion in the image.

On the other hand, when foreign matters adhere to the surface on the object side of the lens 11, as illustrated by the dotted line in FIG. 8, the resulting graph of the contrast value is relatively flat or shows an increase toward the closest side, and the graph does not show a peak value with respect to the image forming position.

Therefore, the foreign matter determination part 19 can determine, in the determination processing in step S106, that the image is focused when it is estimated that a peak value of the contrast value is present, and determine that the image is not focused when it is not estimated that a peak value is present. For example, when an image is generated at consecutive three image forming positions and the contrast value of the central image is higher than that of the previous and the next images, the foreign matter determination part 19 can estimate that there is a peak value. Further, the foreign matter determination part 19 can estimate that there is a peak value when a curve approximated from the contrast value of the image generated on at least three image forming positions forms a convex graph.

In this manner, when a peak of the contrast value with respect to a change of the image forming position is estimated, the presence of foreign matters adhered to the lens 11 (the wind shield 24 in the case of in-vehicle imaging apparatus 25) can be determined without setting the threshold of the contrast value in advance by actual measurement.

In the aforementioned Embodiments 1 and 3, in order to determine a focused state with accuracy, a method of providing a threshold with respect to the contrast value and a method of detecting a peak of the contrast value with respect to the change of image forming position are individually used. However, these methods may be combined. For example, it may be determined that the image is focused only if the peak value of the estimated contrast value exceeds the predefined threshold of the contrast value.

Embodiment 4

Figure 9:
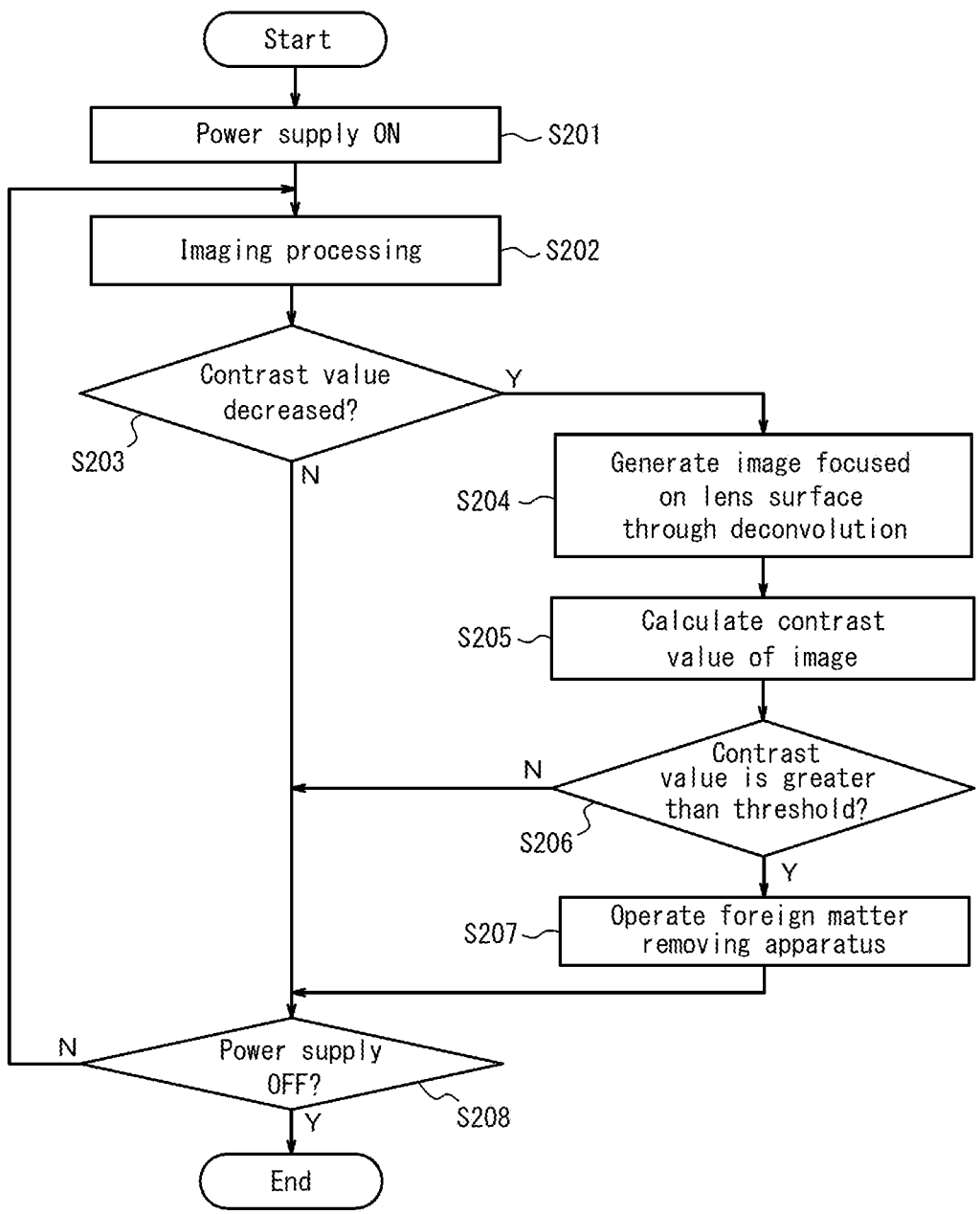
FIG. 9 is a flowchart illustrating a process by a controller according to Embodiment 4.
Figure 10:
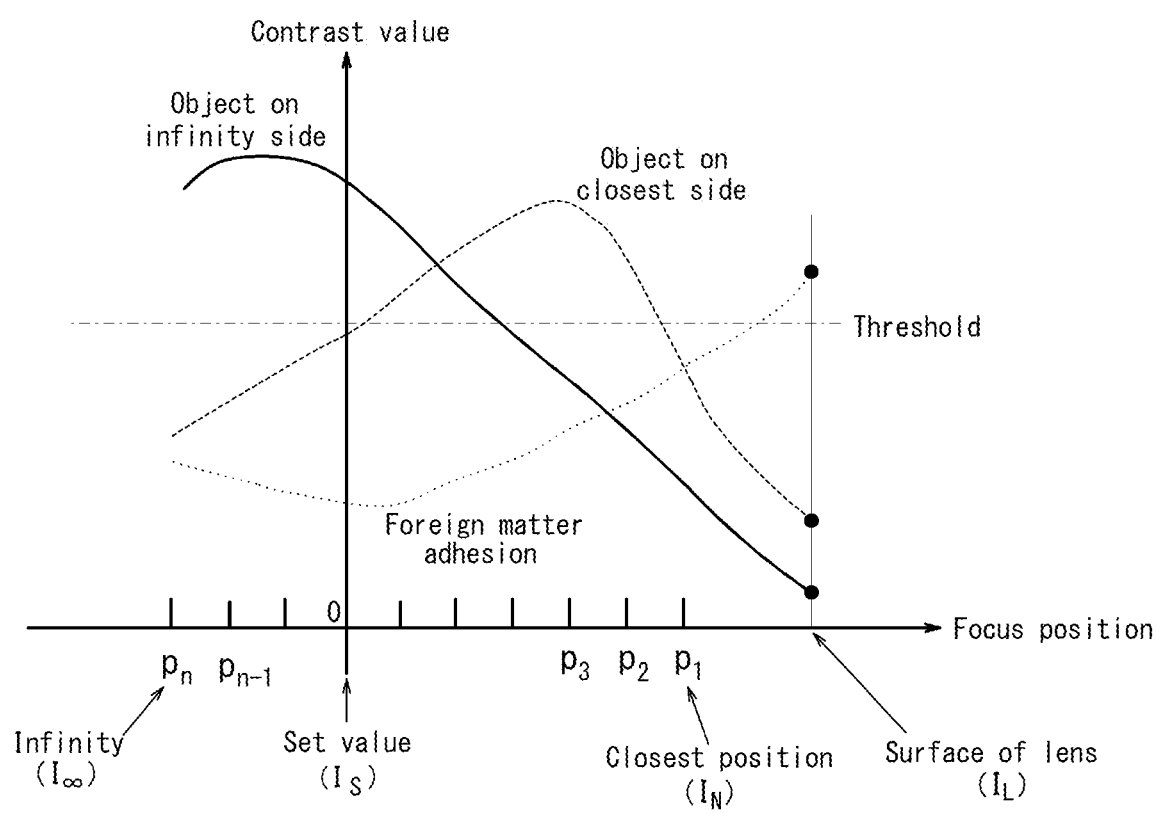
FIG. 10 is a diagram illustrating a foreign matter adhesion determination method according to Embodiment 4.

FIG. 9 is a flowchart illustrating a processing by the controller 14 of the imaging apparatus 10 that forms the imaging system according to Embodiment 4, which is one of embodiments of this disclosure. Further, FIG. 10 is a diagram illustrating a method of determining the presence of adhesion of foreign matters according to Embodiment 4. The imaging system according to Embodiment 4 is formed by the same components as those of Embodiment 1 as illustrated in FIG. 4. Further, among the processings by the function blocks of the controller 14, although the processing by the deconvolution processor 17 and that by the foreign matter determination part 19 are different, the operations by the other function blocks are the same as those of Embodiment 1. Therefore, the same reference signs as those of Embodiment 1 are assigned to each component, and only differences from Embodiment 1 will be described on the basis of the flowchart illustrated in FIG. 9.

First, the process from step S201 to step S203 is the same as that from step S101 to step S103, and thus the explanation thereof is omitted. In step S204, the deconvolution processor 17 defines a surface on the object side of the lens 11 as a focus position. The deconvolution processor 17 performs a convolution operation to an image output from the A/D converter 13 by using the inverse filter of the optical characteristics of blur stored in the storage 18 to generate a focus position change image.

Next, the foreign matter determination part 19 calculates the contrast value with respect to the focus position change image whose focus is put on the surface of the lens 11 generated by the deconvolution processor 17 (step S205). When foreign matters adhere to the surface on the object side of the lens 11, a high contrast value is obtained. This is explained below with reference to FIG. 10.

FIG. 10 is a diagram illustrating a contrast value when a focus is put on the surface on the object side of the lens 11. This graph is obtained by extending the graph in FIG. 2 to the image forming position corresponding to the surface on the object side of the lens 11. In this embodiment, the image forming position at which a focus position change image is generated can be only the image forming position of the object image $I_L$ corresponding to the surface (lens surface) on the object side of the lens 11 at the right end of the graph. However, image forming positions corresponding to other object distances are also illustrated in FIG. 10 for explanation.

With respect to the graphs showing the contrast value when an object is located on infinity side and the closest side, indicated respectively by the solid line and the broken line, the contrast value decreases as the focus position closes to the surface on the object side of the lens 11 (i.e. as the image forming position closes to the right end of the graph). On the other hand, when foreign matters adhere to the surface on the object side of the lens 11, as indicated by the graph of the dotted line, the contrast value increases at the image forming position corresponding to the surface on the object side of the lens 11. Thus, the curve indicating the contrast value increases as the focus position closes to the surface on the object side of the lens 11 and exceeds the predefined threshold, thus is determined as a focused state.

Here, in order to distinguish the state where no foreign matters such as waterdrops adhere to the surface on the object side of the lens 11 from the state where foreign matters adhere thereto, the threshold is determined by measuring the contrast value in advance by putting a focus on the surface on the object side of the lens 11 under the aforementioned states.

Referring back to FIG. 9, the foreign matter determination part 19 compares the contrast value calculated in step S205 with the threshold (step S206). When the contrast value of the focus position change image focused on the surface on the object side of the lens 11 is less than the threshold, the foreign matter determination part 19 determines that no foreign matter adheres, and ends the foreign matter detection process. After that, the controller 14 proceeds to step S208. On the other hand, when the contrast value of the focus position change image is the threshold or more, the foreign matter determination part 19 determines that foreign matters adhere. When determining that foreign matters adhere, the foreign matter determination part 19 outputs a signal indicating an abnormality to the foreign matter removing apparatus 15 through the output part 20 to operate the foreign matter removing apparatus 15 (step S207).

The process after that is the same as that of Embodiment 1, and the aforementioned process is repeated until the power supply is turned off (step S208).

As aforementioned, according to the imaging system of this embodiment, foreign matters adhered to the surface on the object side of the lens 11 can be detected by calculating the contrast value by generating a focus position change image whose focus is put on the surface of the lens 11 of the imaging apparatus 10. Further, according to this method, it is not necessary to generate a plurality of focus position change images whose focuses are put respectively on a plurality of object positions. Thus, compared with Embodiment 1, the processing load on the controller 14 can be reduced.

Further, the imaging system according to this embodiment can also be applied to the imaging system that includes the imaging apparatus 25 disposed in the vehicle as illustrated in FIG. 5. In that case, in step S104, a focus position change image whose focus is put on the surface of the wind shield 24 in front of the imaging apparatus 25 is generated. When the contrast value of this focus position change image exceeds the threshold, it is determined that foreign matters adhere to the surface of the wind shield 24, and the foreign matters adhered to the wind shield 24 are removed by the foreign matter removing apparatus 26.

Embodiment 5

Figure 11:
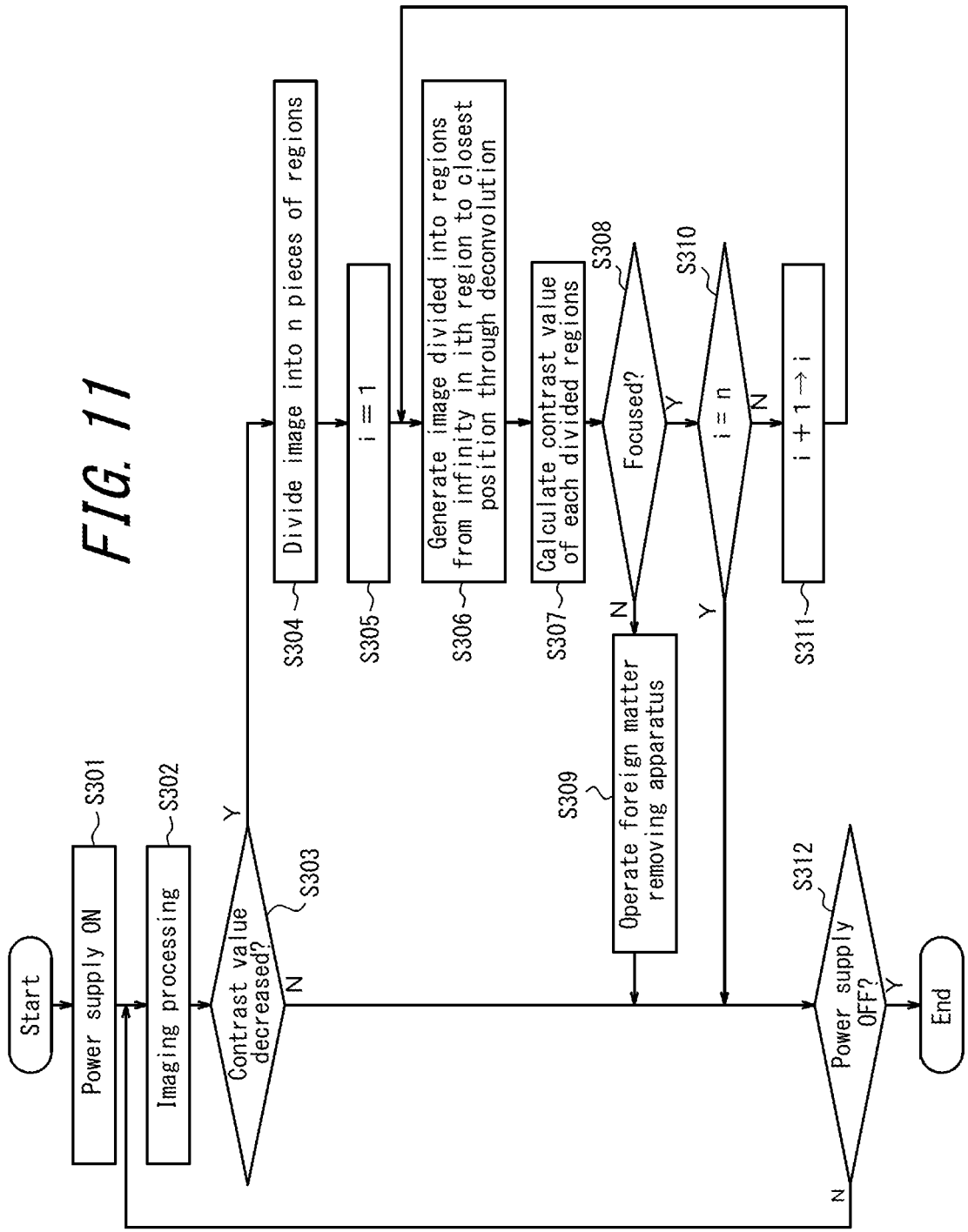
FIG. 11 is a flowchart illustrating a processing by a controller according to Embodiment 5.

FIG. 11 is a flowchart illustrating a process by the controller 14 of the imaging apparatus 10 that forms the imaging system according to Embodiment 5, which is one of embodiments of this disclosure. The imaging system according to Embodiment 5 is formed by the same components as those of Embodiment 1 as illustrated in FIG. 4, and among the processings by the controller 14, the processings by the image processor 16, the deconvolution processor 17 and the foreign matter determination part 19 are different from those of Embodiment 1. Therefore, the same reference signs as those of Embodiment 1 are assigned to each component, and description is given to the points that are different from the imaging system according to Embodiment 1.

Figure 12:
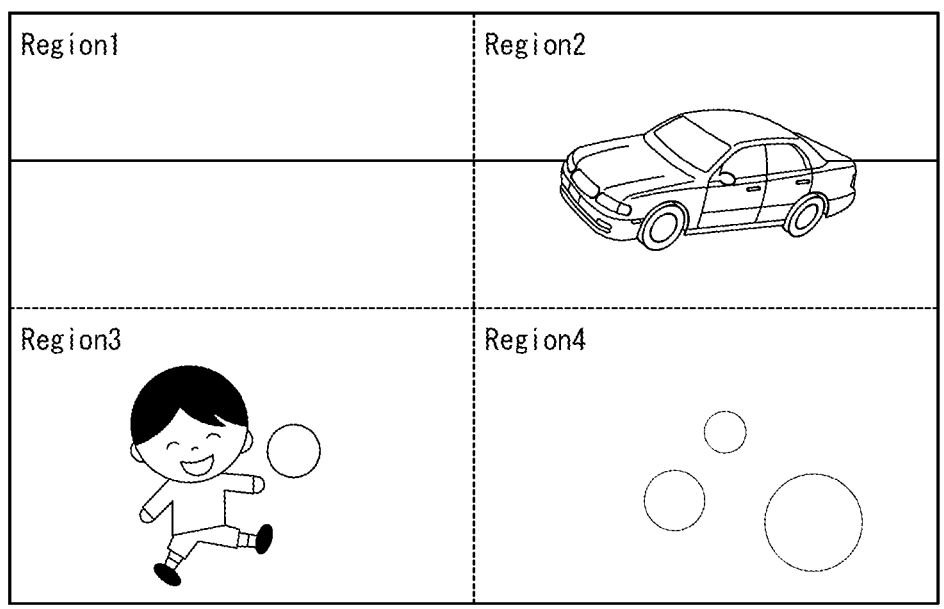
FIG. 12 is a diagram illustrating an example of an image divided into regions.

In the imaging system according to Embodiment 5, a captured image is divided into a plurality of regions to determine the focused state. FIG. 12 illustrates an example of a captured image. Nothing in particular is shown in Region 1, a vehicle located far away is shown in Region 2, and a child located nearby is shown in Region 3. Further, a blurred image of waterdrops adhered to the surface on the object side of the lens 11 is shown in Region 4. In this manner, when objects at object distances different from each other are shown respectively in each region of an image, an image is divided into each region and a focused state is determined with respect to each region. In this manner, adhesion of foreign matters to the surface of the lens 11 can be determined with accuracy. It is to be noted that, in FIG. 12, although an image is divided into four, it is not limited to four.

The process by the controller 14 according to Embodiment 5 is described on the basis of the flowchart illustrated in FIG. 11.

First, the power supply of the imaging apparatus 10 is turned on through drive of an engine of the vehicle 23 or operation by the driver (step S301). Thus the capturing process is started (step S302). During the capturing process, the image processor 16 calculates the contrast value of the image signal output from the A/D converter 13 and monitors a decrease in the contrast value over time (step S303).

When a decrease in the contrast value is not detected, the process proceeds to step S312. When detecting a decrease in the contrast value, the image processor 16 divides the captured image into a plurality of regions (e.g. into n (=4) pieces) (step S304). An image can be divided by various methods. For example, a captured image is processed by using a known object recognition technique to detect a plurality of objects in the image, and a region that includes a main object that occupies a large area in the image may be extracted and divided. Alternatively, in the case of an imaging apparatus that captures an image ahead of the vehicle 23, in general, a distant object is present on the upper part of the image and a near object is present on the lower part thereof, and thus the captured image may be divided in the vertical direction.

Next, the image processor 16 delivers the information on the image in each of divided regions to the deconvolution processor 17. The deconvolution processor 17 chooses an image of the first region (Region 1) (step S305) and performs a convolution operation by using an inverse filter of optical characteristics of blur stored in the storage 18. The deconvolution processor 17 generates a plurality of focus position change images whose focus is put on each of a plurality of object distances from infinity to the closest position (step S306).

Next, the foreign matter determination part 19 calculates the contrast value with respect to each of focus position change images generated by the deconvolution processor 17 (step S307). Here, the contrast value is calculated on the basis of the maximum luminance and the minimum luminance in the range of divided region. Further, the foreign matter determination part 19 compares the contrast value of each focus position change image with the predefined threshold (specific threshold) (step S308). When the contrast value exceeds the threshold, the foreign matter determination part 19 determines that the focus position change image is focused at the focus position.

When determining that any of the focus position change images is focused, the foreign matter determination part 19 determines that no foreign matter adheres, and the process proceeds to step S310. On the other hand, when determining that none of the focus position change images is focused, the foreign matter determination part 19 determines that foreign matters adhere and outputs a signal indicating an abnormality to the foreign matter removing apparatus 15 to operate the foreign matter removing apparatus 15 (step S309), and the process proceeds to step S312.

When it is not determined that foreign matters adhere in the first region, the controller 14 performs foreign matter detection and removal process from step S306 to step S309 with respect to the next region (Region 2). After that, the controller 14 repeats the foreign matter detection process with respect to all regions (Regions 1 to 4) unless a focused state is detected with respect to any of the regions (steps S310 and S311). When no foreign matter is detected after the foreign matter detection process is performed with respect to all regions (Regions 1 to 4), the process proceeds to step S312 without the foreign matter removing apparatus 15 being operated (step S310).

In step S312, the process returns to the capturing process (step S302) unless the power supply is turned off. Thus the process from step S302 to step S312 is repeated until the power supply is turned off.

According to the imaging system of this embodiment, the controller 14 of the imaging apparatus 10 determines the presence of foreign matters adhered to the surface on the object side of the lens 11, thus foreign matters can be removed by the foreign matter removing apparatus 15. Further, an image is divided into a plurality of regions, and thus change in the contrast value is more obvious in each region than the case where the contrast value of the entire image is calculated, and the detection accuracy of foreign matter is improved. Further, dividing an image into regions allows for easy detection of foreign matters when foreign matters adhere only to a portion of the lens 11.

The imaging system according to this embodiment can also be applied to the imaging system that includes the imaging apparatus 25 disposed in the vehicle as illustrated in FIG. 5.

It is to be noted that this disclosure is not limited only to the aforementioned embodiments, and a variety of modifications or changes are possible. For example, in the aforementioned each embodiment, when the image processor 16 detects a decrease in the contrast value, the deconvolution processor 17 and the foreign matter determination part 19 perform a process of detecting a foreign matter adhesion (e.g. steps from S104 to S106 of Embodiment 1). However, the foreign matter adhesion detection process by the deconvolution processor 17 and the foreign matter determination part 19 can be performed on the basis of various operations by a driver or reception of signals. For example, foreign matter detection may be performed when the camera power supply is turned on. Alternatively, the detection may be performed by obtaining a signal that is output when a driver turns on a wiper switch.

Further, in the imaging apparatus according to this disclosure, when determining that foreign matters adhere to the surface on the object side closest to the object of the imaging optical system or to the surface of the light transmissive member located closer to the object than the imaging optical system, the controller 14 transmits a signal indicating an abnormality to the foreign matter removing apparatus. The controller 14 may be configured to transmit a signal indicating an abnormality not only to the foreign matter removing apparatus but also to other systems of the vehicle 23 that control on the basis of an image from the imaging apparatus. Thus occurrence of failure caused by a processing by other systems that use an image having less accuracy due to foreign matters can be reduced.

Further, this disclosure can be applied also to outdoor surveillance cameras not only as a vehicle mounted image system but also as an imaging apparatus having a foreign matter removing apparatus.

REFERENCE SIGNS LIST

1 Lens (imaging optical system)
2 Light receiving surface
10 Imaging apparatus
11 Lens
12 Image sensor
13 A/D converter
14 Controller (processor)
15 Foreign matter removing apparatus
16 Image processor
17 Deconvolution processor
18 Storage
19 Foreign matter determination part
20 Output part
21 Monitor
22 Lens holding part
23 Vehicle
24 Wind shield (light transmissive member)
25 Imaging apparatus
26 Foreign matter removing apparatus

The invention claimed is:

1. An imaging apparatus comprising:
an imaging optical system configured to form an image of an object;
an image sensor configured to obtain the image of the object formed by the imaging optical system, wherein a light receiving surface is disposed at a focused position by the imaging optical system when the object is located at a specific object distance; and
a processor configured
to cause the imaging optical system to obtain a first image,
to generate one or more second images by changing a focus position of the first image to an object distance different from the specific object distance and,
to determine whether foreign matters are located on a surface on a side closest to the object of the imaging optical system or to a surface of a light transmissive member located closer to the object than the imaging optical system on a basis of a focused state of the second image,
wherein the processor generates second images whose focus is put on the object distance different from the specific object distance in a range from infinity to a closest position set on a side closer to the object than the imaging optical system or the light transmissive member and determines that no foreign matters are located on the surface on a side closest to the object when determining any of the second images is focused.

2. The imaging apparatus according to claim 1, wherein the processor calculates a contrast value of the second image and determines that the second image is focused when the contrast value is larger than a specific threshold.

3. The imaging apparatus according to claim 1, wherein the processor generates the second images with respect to three or more object distances in a range from infinity to the closest position, calculates contrast values of the second images respectively and determines that the second images are focused when estimating that a peak value is present in a change of the contrast values with respect to the object distances.

4. The imaging apparatus according to claim 1, wherein the processor generates the second images, the second images being focused on the object distances, respectively, set so that a distance from infinity to the closest position is included in a range of a depth of field of any of the second images.

5. The imaging apparatus according to claim 4, wherein the processor generates, as the second image, an image obtained by disposing the image sensor at a focused position different from the focus position of the first image when a focus position of an object located at infinity is displaced to a side closer to the object due to environmental change and at a focused position different from the focus position of the first image when a focus position of an object located at the closest position is displaced to a direction opposite a direction of the object due to environmental change.

6. The imaging apparatus according to claim 1, wherein the processor generates the second image whose focus is put on the surface on the object side of the imaging optical system or the surface on the light transmissive member, and determines that the foreign matters are located on the surface on the side closest to the object when the generated second image is determined to be focused.

7. The imaging apparatus according to claim 6, wherein the processor calculates a contrast value of the second image and determines that the second image is focused when the contrast value is greater than a specific threshold.

8. The imaging apparatus according to claim 1, wherein the processor divides the first image obtained by the image sensor into a plurality of regions, generates the second image with respect to each of the regions and determines whether the second image is focused or not.

9. The imaging apparatus according to claim 1, wherein the processor generates the second image by performing a deconvolution processing by using Point Spread Function set in advance on a basis of a configuration of the imaging optical system.

10. The imaging apparatus according to claim 1 comprising an output part configured to output a signal indicating an abnormality when the processor determines that the foreign matters are located on the surface on the object side of the imaging optical system or the surface of the light transmissive member.

* * * * *